(12) United States Patent
Violette

(10) Patent No.: US 6,676,080 B2
(45) Date of Patent: Jan. 13, 2004

(54) COMPOSITE AIRFOIL ASSEMBLY

(75) Inventor: John A. Violette, Granby, CT (US)

(73) Assignee: Aero Composites, Inc., Doylestown, PA (US)

( * ) Notice: Subject to any disclaimer, the term of this patent is extended or adjusted under 35 U.S.C. 154(b) by 331 days.

(21) Appl. No.: 09/908,921

(22) Filed: Jul. 19, 2001

(65) Prior Publication Data

US 2002/0008177 A1 Jan. 24, 2002

Related U.S. Application Data

(60) Provisional application No. 60/219,293, filed on Jul. 19, 2000.

(51) Int. Cl.$^7$ .............................. B64C 1/00; B63H 1/20
(52) U.S. Cl. ................... 244/123; 416/204 R; 416/218; 416/220 R; 416/229 R; 264/46.9
(58) Field of Search ...................... 244/123; 416/204 R, 416/215, 218, 220 R, 223 R, 229 R; 264/46.9

(56) References Cited

U.S. PATENT DOCUMENTS 3,487,879 A    1/1970   McCarthy et al.
4,268,571 A    5/1981   McCarthy
4,524,499 A    6/1985   Grimes et al.
4,810,167 A    3/1989   Spoltman et al.
4,834,616 A    5/1989   Kasarsky et al.
4,966,527 A   10/1990   Merz
5,049,036 A *  9/1991   Bailey et al. ............... 416/230
5,222,297 A    6/1993   Graff et al.
5,292,231 A *  3/1994   Lauzeille ................ 416/229 A
5,439,353 A    8/1995   Cook et al.
5,573,377 A * 11/1996   Bond et al. ............. 416/229 A
6,155,784 A   12/2000   Carter, Jr.

* cited by examiner

Primary Examiner—J. Woodrow Eldred
(74) Attorney, Agent, or Firm—Akin, Gump, Strauss, Hauer & Feld, L.L.P.

(57) ABSTRACT

A composite blade assembly comprises a root portion and blade portion that is connected to the root portion. The root portion comprises inner and outer rings and the blade portion comprises at least one layer of composite material that is folded to form a loop. The inner ring is disposed in the loop and the outer ring is disposed outside the loop such that a portion of the loop is positioned between the inner and outer rings. In this manner, the loop portion is held in compression between the inner and outer rings at least when the composite blade assembly is subject to centrifugal force to thereby prevent separation of the root portion and blade portion.

22 Claims, 5 Drawing Sheets

COMPOSITE AIRFOIL ASSEMBLY

CROSS-REFERENCE TO RELATED APPLICATIONS

This application claims the benefit of U.S. Provisional Patent Application No. 60/219,293 filed on Jul. 19, 2000 and entitled "Composite Propeller Blade."

BACKGROUND OF THE INVENTION

This invention relates to composite structures, and more particularly to composite airfoils.

In aircraft applications, weight reduction of aircraft components is highly desirable, but can be difficult to achieve without sacrificing strength, safety and durability, especially with rotating hardware. Rotary components such as propeller blades, fan blades, rotor blades, and other propulsory blades or airfoils are subject to high loads from centrifugal forces, steady and vibratory bending loads, and impact loads from foreign objects. Propulsory blades constructed of composite materials can exhibit acceptable levels of tensile strength and other material properties and are typically lighter than their wood and metal counterparts. Many composite materials thus improve structural efficiency and allow thinner blades and improved aerodynamic performance. A typical propulsory blade may include a shell and an internal load-bearing spar that is connected to the shell through adhesive bonding at an attachment region. The shell is typically constructed of lightweight composite material, such as fiber-reinforced resin, and the spar is typically constructed of a metal or composite material and bonded to the interior of the shell. The spar extends from within the shell cavity and terminates in a root portion that is adapted for connection to a rotor shaft of an aircraft engine or the like. The root portion is also typically constructed of a metallic material.

However, the attachment region between the composite shell and the spar and/or root portion is relatively heavy and structurally inefficient, since the attachment region is designed such that loads on the shell are transferred to the root portion through shear forces. Inter-laminar shear forces in the shell are first transferred from one high strength composite layer to another, and then to the spar and/or root portion through shear forces at the attachment region. These shear forces are relatively weak when compared to the tensile strength of the composite layers. Thus, current propulsory blade construction does not take advantage of the higher tensile forces typically found in the composite layers.

The design of a connection joint between the composite shell and root portion that achieves acceptable uniform stress levels is an inexact science. Areas at the edges of the joint can develop high peel stresses, which greatly reduce shear strength and can lead to progressive delamination between composite layers, in the composite-to-adhesive joint, within the adhesive itself, as well as in the adhesive-to-metal joint, requiring monitoring and costly inspections and/or separate "backup" joints to preclude premature blade failure. If a peeling force is present, the relatively low resistance to shear force can drop by a factor of two or more. Accordingly, adhesive joints typically require large, heavy areas of carefully tapered composite and metal surfaces to reduce stresses.

Thus, there is a continuous need to develop a practical and efficient composite propulsory blade that is safely and securely joined to a root portion.

SUMMARY OF THE INVENTION

According to the invention, a composite blade assembly comprises a root portion and blade portion that is connected to the root portion. The root portion comprises inner and outer rings and the blade portion comprises at least one layer of composite material that is folded to form a loop. The inner ring is disposed in the loop and the outer ring is disposed outside the loop such that a portion of the loop is positioned between the inner and outer rings. In this manner, the loop portion is held in compression between the inner and outer rings at least when the composite blade assembly is subject to centrifugal force to thereby prevent separation of the root portion and blade portion.

Further according to the invention, a composite blade assembly comprises a root portion and a blade portion. The root portion has an inner ring and an outer ring. The blade portion has a plurality of inner and outer layers of composite material that are folded to form a loop. The inner ring is disposed in the loop and the outer ring is disposed outside the loop such that a portion of the loop is positioned between the inner and outer rings. The blade portion forms a hollow interior. A core member is located within the hollow interior adjacent the layers of composite material. A base is positioned against a lower surface of the loop, with the loop and inner ring being sandwiched between the outer ring and the base.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

The invention will now be described in greater detail with reference to the drawings, wherein like parts throughout the drawing figures are represented by like numerals.

DETAILED DESCRIPTION OF THE INVENTION

Figure 1:
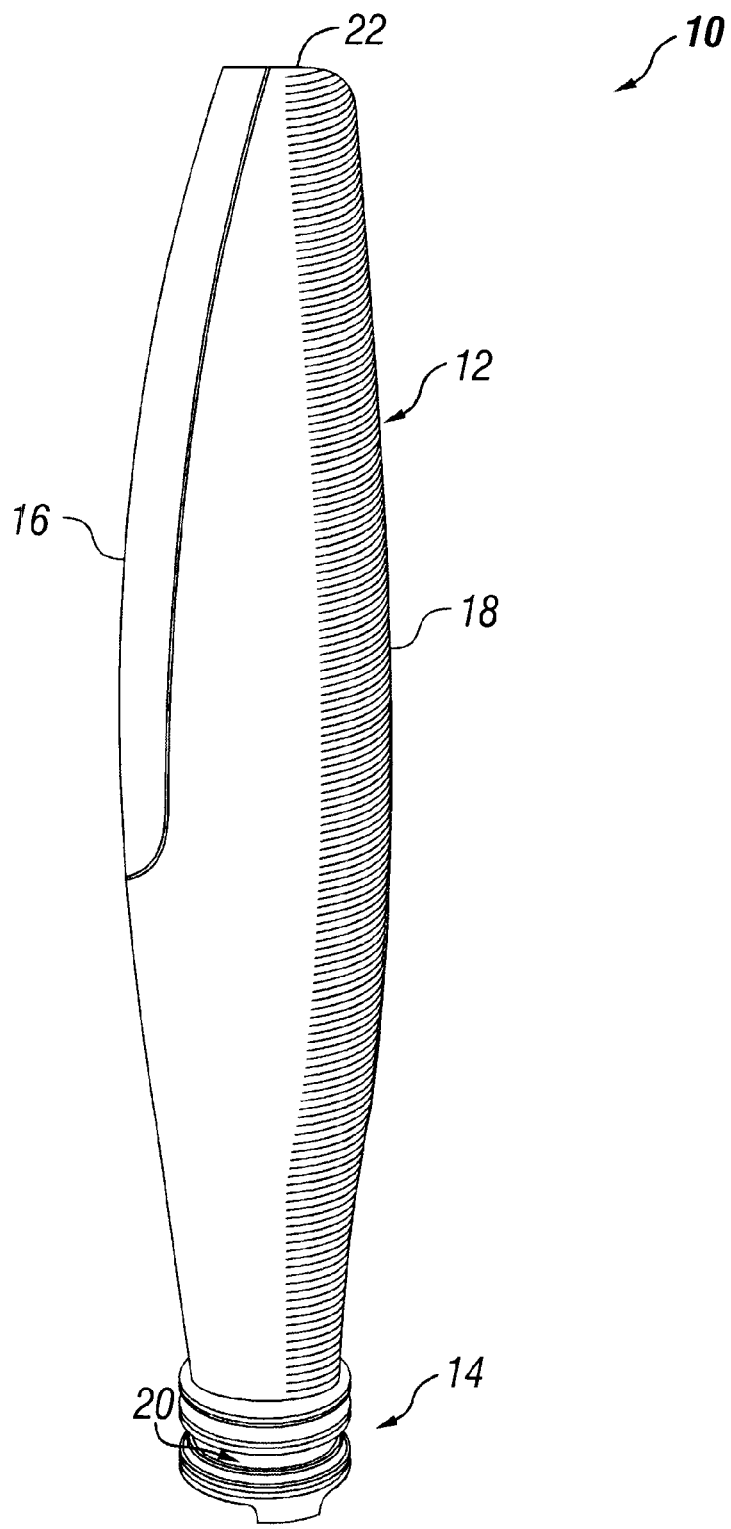
FIG. 1 is a side elevational view of a propulsory blade assembly according to an embodiment of the present invention.

Referring now to the drawings, and to FIG. 1 in particular, a propulsory blade assembly 10 according to an embodiment of the present invention is illustrated. The blade assembly 10 comprises a blade portion 12 constructed of composite material and a root portion 14 that receives and secures the blade portion 12. The root portion 14 is adapted for connection to a hub arm (not shown) of an aircraft propeller, a helicopter rotor, a disk structure of a jet engine compressor assembly, or the like.

The blade portion 12 includes a root area 20 that is securely mounted to the root portion 14, a tip 22, with a leading edge 16 and a trailing edge 18 that extend between the root area and the tip. The blade portion 12 is preferably cylindrical in shape at the root area 20 and transitions to an airfoil portion that thins and flattens toward the tip 22. The blade portion may also spiral or twist toward the tip in a well-known manner, depending on the type of propulsory blade to be constructed.

With additional reference to FIG. 2, the root area 20 includes an annular loop 24 that connects to the root portion 14, as will be described in greater detail below. The annular loop 24 forms a teardrop-shaped annular bore 26. Although an exemplary embodiment of the invention is described as a propulsory blade assembly for an aircraft engine, it will be understood that the present invention can be applied to any rotary airfoil or blade structure.

Figure 3:
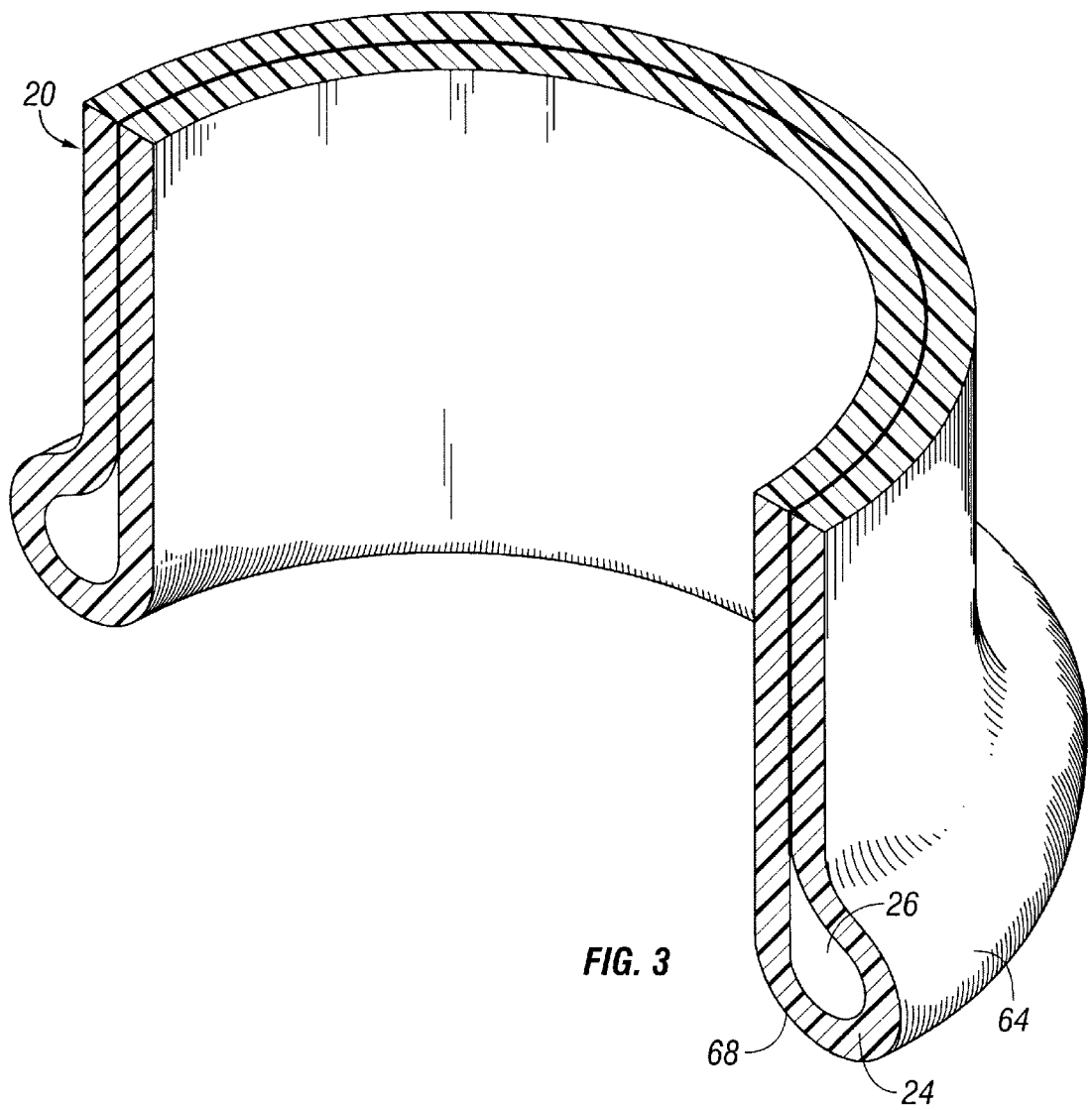
FIG. 3 is a perspective cross sectional view of a root portion of the propulsory blade assembly.
Figure 4:
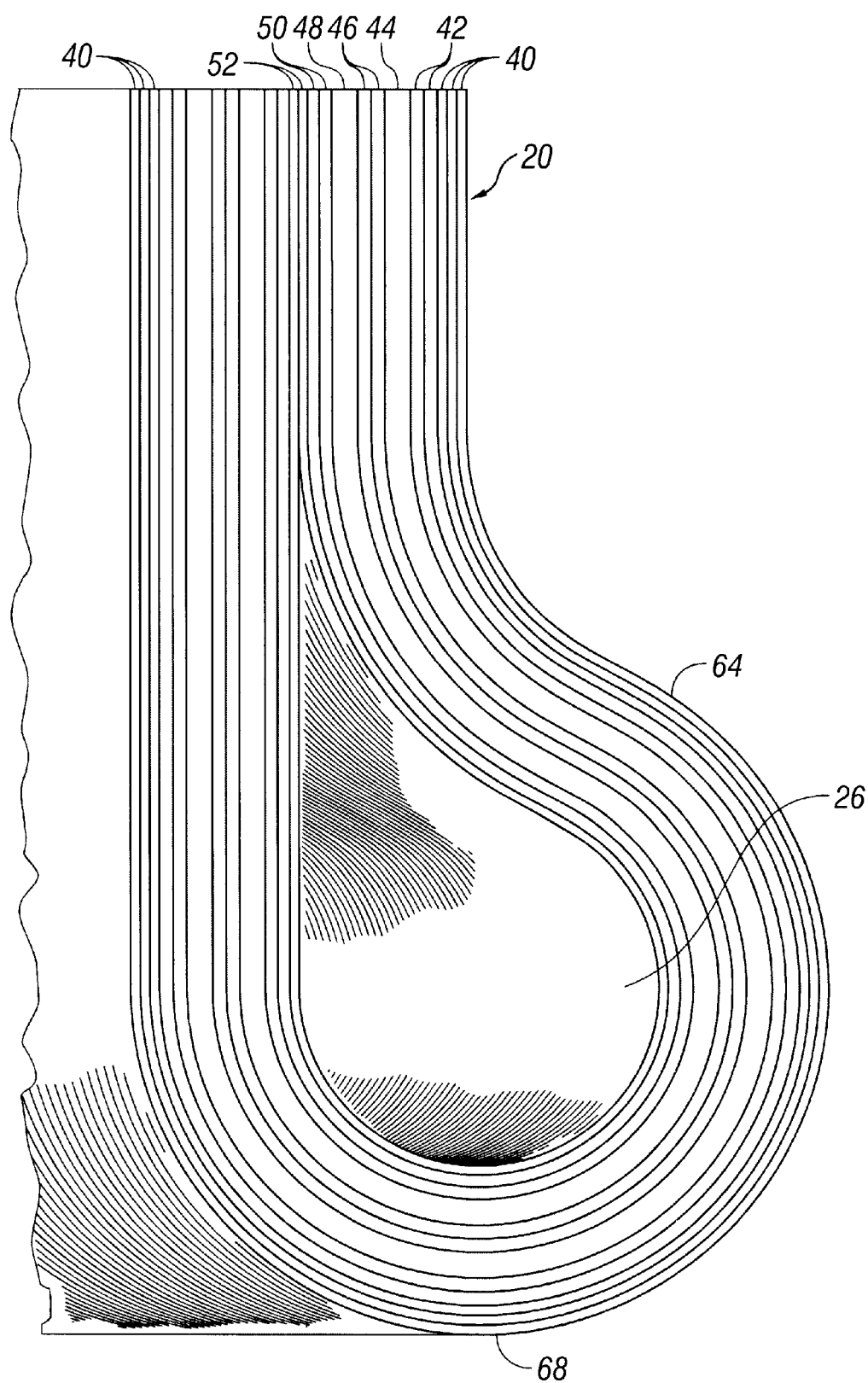
FIG. 4 is an enlarged cross sectional view of the root portion.

With additional reference to FIGS. 3 and 4, the blade portion 12 is preferably constructed of layers of braided glass fibers and layers of uni-directional, woven graphite positioned between the layers of glass fibers. The glass fiber and graphite layers are embedded in a suitable resin material. Integrating the glass fiber layers and the graphite layers in this manner minimizes residual thermal strains that arise when composite layers of differing thermal expansion rates are cooled to room temperature from an elevated resin cure temperature, as well as thermal strains that arise at lower component operating temperatures. Accordingly, the interlaminar shear strength of the composite is maximized.

According to an exemplary embodiment of the invention, the blade portion 12 comprises three outer layers 40 of thin braided glass fiber material, followed by a pair of first inner layers 42 of graphite material, a first inner layer 44 of thick braided glass fiber material, a pair of second inner layers 46 of graphite material, a second inner layer 48 of thick braided glass fiber material, a pair of third inner layers 50 of graphite material, and a third and fourth inner layers 52 of thin braided glass fiber material. Preferably, the outer layers 40 and third and fourth inner layers 52 of the braided glass fiber material are approximately 0.010 inch thick while the first inner layer 44 and second inner layer 48 of the braided glass fiber material are approximately 0.026 inch thick. The thickness of the braided glass fiber material will vary in accordance with the local perimeter required to accommodate local blade geometry variations.

Before application of the resin material, the dry layers of braided glass fiber and graphite materials are flexible and can be folded to form the loop 24. As shown, the layers are preferably folded such that the third inner layer 52 of braided glass fiber material is in contact with itself outside of the loop 24 and the outer layers 40 are on the outside of the blade portion and also on the inside of the blade portion adjacent a foam core 30 (FIG. 2) located in the interior of the blade portion 12.

The braided glass fiber layers are preferably of continuous, tubular construction and are oriented such that the glass fibers extend at an angle of approximately 30 to 60 degrees with respect to a longitudinal axis of the blade portion, and preferably at about 45 degrees where greatest torsional rigidity is required by the particular configuration, although this angle can vary due to the non-uniform shape and local perimeter of the blade portion 12. The outer layers 40 of glass fibers are naturally resistant to foreign object impact and are easily repairable with standard techniques. In addition, the tubular braid is preferable to multiple cut layers of woven material because wrap joints and/or edge joints are eliminated, increasing damage resistance. The plural thin layers on the exterior of the blade portion enhance these benefits.

The inner layers 42, 46 and 50 of graphite material are preferably each approximately 0.014 inch thick and are constructed of axial tows of graphite fiber, held together with a small number of cross-woven and adhesively coated fiberglass threads to form tape-like strips. With this arrangement, the graphite layers can be conveniently handled during the blade lay-up process. The graphite fibers are preferably oriented span-wise along the length of the blade portion on each of the flat sides of the blade to thereby provide resistance to tensile stresses imposed by centrifugal forces generated during rotation of the propulsory blade assembly 10, as well as resistance to bending loads.

Preferably, most layers of the fiberglass material and all layers of the graphite material extend from the root area 20 and terminate at varying distances along the blade portion 12 in accordance with thickness, stiffness and strength requirements. The graphite layers are preferably terminated inboard of the tip 22 (FIG. 1) to prevent potential conduction of electrical energy from possible lightning strikes.

Although preferred materials, material thickness', the particular number and placement of layers, and fiber orientations have been described with particular detail in accordance with an exemplary embodiment of the invention, it will be understood that other materials and material thickness', as well as the number and placement of layers and fiber orientations can vary without departing from the spirit and scope of the present invention. Particular materials, material thickness', the number and placement of layers, and fiber orientations can be chosen to accommodate strength requirements or avoid undesirable resonance in accordance with the particular airfoil application. For example, one or more of the glass fiber layers can be replaced with graphite, Kevlar® or other suitable material. Likewise, one or more of the graphite layers can be replaced with other suitable material(s).

Figure 2:
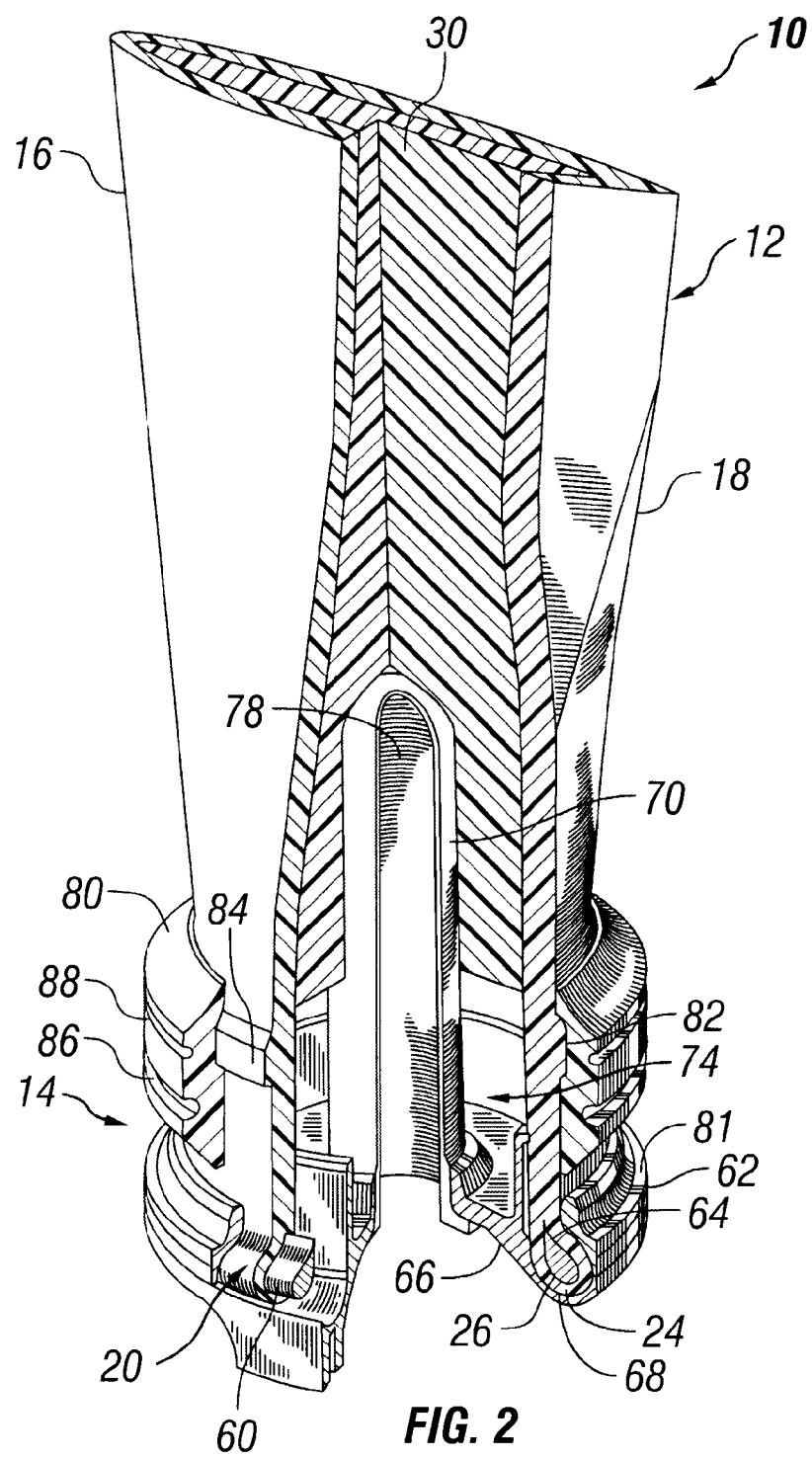
FIG. 2 is a perspective view in partial cross section of a lower portion of the propulsory blade assembly of FIG. 1.

With particular reference to FIG. 2, the root portion 14 of the propulsory blade assembly 10 includes an inner ring 60 located in the annular bore 26 of the loop 24, an outer ring 62 that is positioned against an upper surface 64 of the loop 24, and a generally cup-shaped base 66 that is positioned against a lower surface 68 of the loop. Preferably, the loop 24 and inner ring 60 are sandwiched between the outer ring 62 and the base 66. A tube 70 extends through a central opening 72 in the base 66. The tube 70 and base 66 close a hollow cavity 74 of the root 20 formed by the composite material to prevent intrusion of oil and/or moisture into the hollow root cavity which may otherwise damage the foam material. The tube 70 has a hollow receptacle 78 that receives various balancing weights (not shown) for assuring that the horizontal mass moments of each blade in a propeller assembly are matched prior to rotor balancing. The base 66 can contain a pin (not shown) or other provision for adjusting the pitch angle of the blade through well-known hydraulic means or the like.

The rings 60 and 62 are preferably machined from high strength stainless steel, although titanium or other suitable metals or composites can be used. The inner ring 60 is preferably teardrop-shaped in cross section to match the shape of the annular bore 26. The outer ring 62 has an annular surface 81 that bears against a retaining surface (not shown) of a rotor hub (not shown) in a well known manner to prevent separation of the propulsory blade assembly 10 from the rotor hub under high outward centrifugal force during rotation of the hub. The surface 81 can alternatively be formed as an integral bearing race of an angular contact ball bearing assembly (not shown) or can be shaped to receive tapered roller bearings, deep groove thrust or roller bearings, or two-piece bearing races.

The centrifugal pull force produces a compressive load on a substantial portion of the composite between the inner ring 60 and outer ring 62. This construction is advantageous for the following reasons: 1) most of the composite to metal bond joint is in a state of high compression, which maximizes its shear strength by avoiding the weaker peel mode of failure; 2) the required bond area is minimized; and 3) with all composite layers wrapped around the inner ring, and with the inner ring being too large to slip past the outer ring under the outward centrifugal force, the blade portion 12 is mechanically locked to the root portion 14. Thus, should there be a bond joint failure, this construction prevents separation of the blade portion 12 from the root portion 14.

The tube 70 and base 66 are preferably constructed of aluminum material, but may alternatively be constructed of other materials, such as steel, composites, plastic, and so on. The base 66 is adhesively bonded to the blade portion 12 along their mutual interface. The tube 70 can be bonded or press-fit into the base 66. Additionally, the tip of the tube can be attached to the inner core through an adhesive joint and/or elastomeric cushioning or the like, to thereby reduce potential vibration of the tube. Although the base 66 and tube 70 are shown as separate items, it will be understood that they can be formed as a single unit through injection molding, machining, or other well known forming techniques.

A retaining collar 80 is preferably formed on or bonded to the exterior of the blade portion 12 adjacent the outer ring 62. If bonded, the collar 80 is preferably of two-piece construction. The collar 80 can be formed of a plastic material, although other materials such as aluminum, steel or the like can be used. The collar 80 includes an inner annular groove 82 that mates with an outer annular ridge 84 on the blade portion 12. A lower annular groove 86 and an upper annular groove 88 are formed on the outside of the collar 80. The lower annular groove 86 is adapted to receive an O-ring (not shown) while the upper annular groove is adapted to receive a locking ring (not shown) for holding the propulsory blade assembly 10 against movement into the propeller hub arm (not shown) of an aircraft propeller when not in use. The collar 80 also serves to fill a gap between the blade portion and the bore in the propeller hub arm into which it is received to thereby provide bending stability to the propulsory blade assembly during engine startup and shutdown when centrifugal loads are low, since some propellers on which the blade assembly 10 can be used will be driven by piston engines that produce oscillatory torque variation.

During construction of the propulsory blade assembly 10, dry layers of the braided glass fiber and graphite are wrapped around the inner ring 60 and under the outer ring 62, preferably in the order as previously described, and then placed over the foam core 30 (FIG. 2). The foam core 30 is preferably constructed of a light-weight closed-cell foam material, such as polyurethane foam. The core 30 serves as an integral mandrel during lay-up of the dry composite layers. The closed cell construction also prevents resin intrusion during resin transfer molding (RTM) of the assembly. As shown, the foam core 30 preferably stops short of the base 66, but can alternatively extend into the base.

The dry assembly, including the inner core 30, the dry layers of material, the inner ring 60 and the outer ring 62 are then inserted into a mold. Suitable resin is subsequently injected into the mold to fill the spaces between the components and layers. The resin is then cured at an elevated temperature, after which the assembly is released from the mold.

The above-described construction takes advantage of the tensile strength of graphite fibers in resin, for instance, which can be over 200 times greater per square inch than that of an adhesive joint in shear, and/or the shear strength that exists in the inter-laminar resin matrix material between composite layers.

Figure 5:
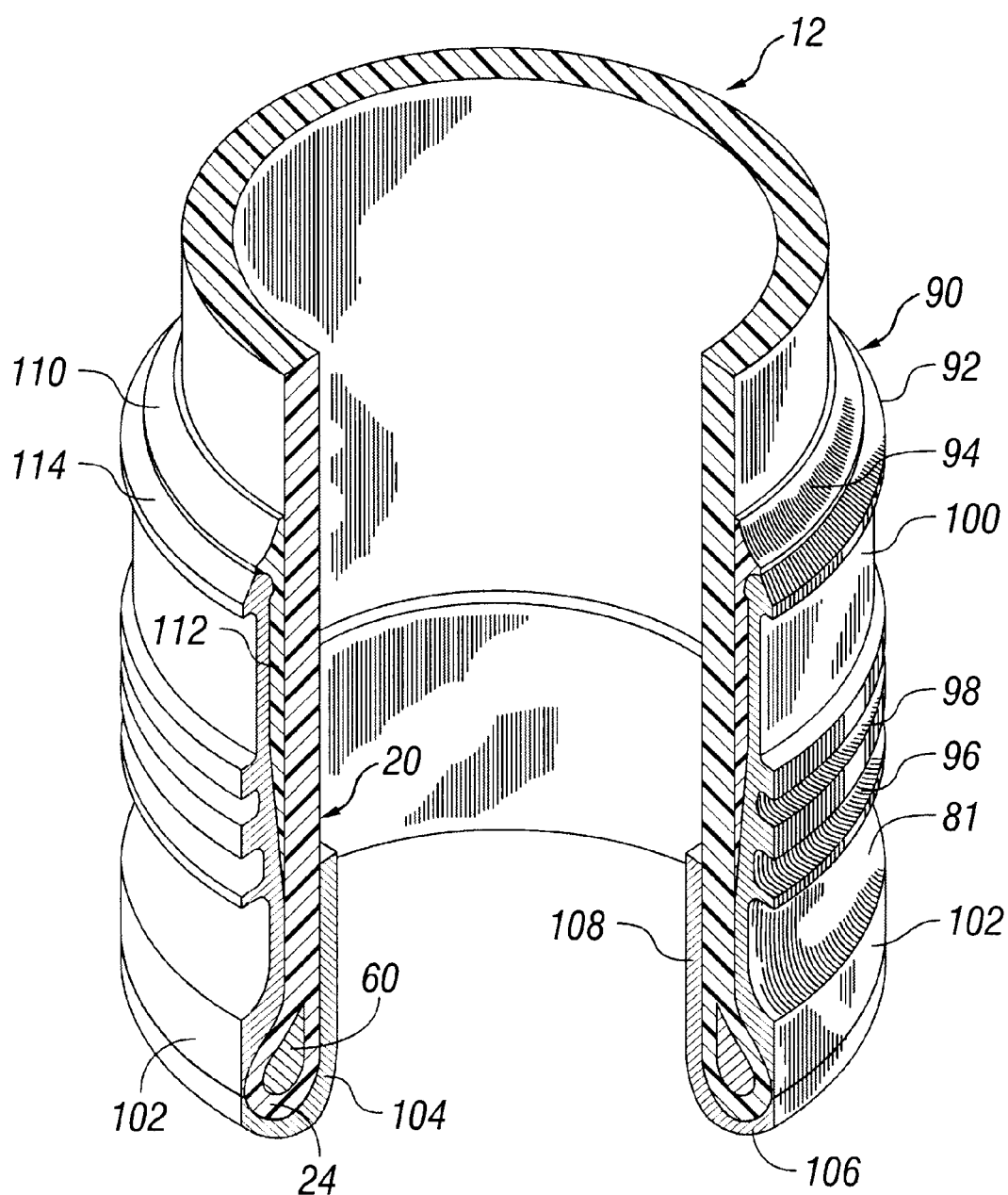
FIG. 5 is a perspective view in partial cross section of a lower portion of the propulsory blade assembly according to a further embodiment of the invention.

With reference now to FIG. 5, a root portion 90 according to a further embodiment of the invention is illustrated, wherein like parts in the previous embodiment are represented by like numerals. The root portion 90 includes an extended outer ring 92 that replaces the collar 80 and the outer ring 62 of the previous embodiment, and a sleeve 94 that extends between a portion of the extended outer ring 92 and the root area 20 of the blade portion 12.

The sleeve 94 is preferably bonded to the outer ring 92. The outer ring 92 is of single-piece construction and is preferably formed of a metal material, such as stainless steel, although other materials such as aluminum, composite, plastic, or the like can be used. The outer ring 92 includes a lower annular groove 96 and an upper annular groove 98 that are similar in construction and function to the lower and upper annular grooves, respectively, of the collar 80 as previously described. An annular channel 100 is formed in the outer ring 92 above the upper annular groove 98. The channel 100 is adapted to receive and hold a two-piece counterweight (not shown) to provide a twisting force that returns the blade portion 12 to a high pitch angle or feather position. Alternatively, the channel 100 could be replaced with an integral flange or the like for connecting the counterweight to the outer ring 92 in a well-known manner. In this manner, propeller overspeed is prevented and propeller drag loads are minimized to thereby more easily control multi-propeller aircraft when one propeller is not functioning. The surface 81 as shown is preferably an integral bearing race of an angular contact ball bearing assembly (not shown). Alternatively, the surface 81 can be similar in shape to the surface 81 of the previous embodiment, or can be shaped to receive tapered roller bearings, deep groove thrust or roller bearings, or two-piece bearing races.

A base 104 is positioned adjacent the blade portion 12 opposite the collar 92 and includes a curved lower end 106 and a wall 108 that extends upwardly from the curved lower end. The inner ring 60 and the root area 20, including the loop 24, are sandwiched between a lower end 102 of the collar 92 and the curved lower end 106 and wall 108 of the base 104. In an alternative embodiment, the base 104 may be similar in shape to the base 66 previously described.

The sleeve 94 is preferably of single-piece construction and molded of a plastic material, such as Delrin® or other acetal material, polyurethane, and so on. The sleeve 94 has an annular flange 110 that rests against a flange 114 of the collar 92 and a wedge-shaped ring 112 that extends downwardly from the flange 114 between the collar 92 and the root area 20. When constructed of plastic material, the sleeve 94 reduces the overall weight of the propulsory blade assembly while enabling the collar 92 to have a sufficiently large outer diameter for proper fit with the propeller hub arm (not shown) in a well known manner. The sleeve 94 also acts as a lower modulus cushion, which can be approximately 50 times less stiff than steel, for absorbing bending loads from the blade portion 12.

The above-described embodiments solve the problem of fabricating a strong, efficient, repairable propeller or rotor blade that is practical and lightweight. The composite blade portion constructed in the above-described manner is advantageous in that it: 1) absorbs and supports high steady and cyclic loads during operation; 2) transitions effectively from an outer blade area to a circular-shaped root area to permit blade pitch change in constant speed propeller designs; 3)

safely transfers loads from within the composite through the inner and outer rings; 4) minimizes bond area and maximizes bond strength by keeping a substantial portion of the connecting joint in compression to thereby avoid a weaker peel mode of failure; and 5) integrates a mechanical backup mechanism into the composite-to-metal joint to safe-guard against blade loss in the event of bond joint failure and/or delamination within the composite blade portion;

It will be understood that the terms forward, rearward, upper, lower, outwardly, inwardly, and their respective derivatives and equivalent terms as may be used throughout the specification refer to relative, rather than absolute orientations and/or positions.

While the invention has been taught with specific reference to the above-described embodiments, those skilled in the art will recognize that changes can be made in form and detail without departing from the spirit and the scope of the invention. For example, although the inner and outer rings have been shown as circular, it will be understood that other shapes, such as oval, square, rectangular, and so on, can be used, depending on the particular application. Moreover, although the particular construction of the composite assembly has been shown and described by way of example as a blade or other airfoil, it will be understood that the assembly can be used for structural members that are subject to tensile forces. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A composite blade assembly comprising:
   a root portion having an inner ring and an outer ring; and
   a blade portion comprising at least one layer of composite material, the at least one layer being folded to form a loop, with the inner ring disposed in the loop and the outer ring disposed outside the loop such that a portion of the loop is positioned between the inner and outer rings;
   wherein the loop portion is held in compression between the inner and outer rings at least when the composite blade assembly is subject to centrifugal force to thereby prevent separation of the root portion and blade portion.

2. A composite blade assembly according to claim 1, wherein the inner and outer rings are sized to prevent movement of the inner ring and the loop portion through the outer ring.

3. A composite blade assembly according to claim 1, and further comprising a base positioned against a lower surface of the loop, with the loop and inner ring being sandwiched between the outer ring and the base.

4. A composite blade assembly according to claim 3, wherein the base includes a central opening, and further comprising a tubular member extending through the central opening.

5. A composite blade assembly according to claim 1, wherein the at least one layer of composite material is a tubular layer of woven material that is folded to form the loop and a hollow blade interior.

6. A composite blade assembly according to claim 5, and further comprising a core member located within the hollow interior.

7. A composite blade assembly according to claim 6, and further comprising a base positioned against a lower surface of the loop, with the loop and inner ring being sandwiched between the outer ring and the base.

8. A composite blade assembly according to claim 7, wherein the base includes a central opening, and further comprising a tubular member extending through the central opening into the hollow interior.

9. A composite blade assembly according to claim 8, wherein the tubular member extends into the core member.

10. A composite blade assembly according to claim 6, wherein the core member is constructed of a closed-cell foam material.

11. A composite blade assembly according to claim 1, and further comprising a mounting collar connected to the exterior of the blade portion above the outer ring.

12. A composite blade assembly according to claim 11, wherein the mounting collar and outer ring are integrally formed as a unitary outer ring.

13. A composite blade assembly according to claim 12, and further comprising a wedge-shaped ring located between the unitary outer ring and the composite material.

14. A composite blade assembly according to claim 1, wherein the composite material comprises a plurality of material layers embedded in a resin material.

15. A composite blade assembly according to claim 14, wherein the plurality of layers includes at least one outer layer of glass fiber material and at least one inner layer of graphite material.

16. A composite blade assembly according to claim 15, and further comprising at least one inner layer of fiberglass material adjacent the at least one inner layer of graphite material such that the at least one inner layer of graphite material is sandwiched between the inner and outer layers glass fiber material.

17. A composite blade assembly according to claim 1, wherein the loop is teardrop-shaped in cross section, and the inner ring is teardrop-shaped in cross section to conform to the shape of the loop.

18. A composite blade assembly according to claim 1, wherein a bearing surface is formed on the outer ring.

19. A composite blade assembly comprising:
    a root portion having an inner ring and an outer ring;
    a blade portion comprising a plurality of inner and outer layers of composite material, the plurality of layers being folded to form a loop, with the inner ring disposed in the loop and the outer ring disposed outside the loop such that a portion of the loop is positioned between the inner and outer rings, with the blade portion forming a hollow interior;
    a core member located within the hollow interior adjacent the layers of composite material; and
    a base positioned against a lower surface of the loop, with the loop and inner ring being sandwiched between the outer ring and the base.

20. A composite blade assembly according to claim 19, wherein the base includes a central opening, and further comprising a tubular member extending through the central opening into the hollow interior.

21. A composite blade assembly according to claim 20, wherein the tubular member extends into the core member.

22. A composite blade assembly according to claim 19, wherein the loop portion is held in compression between the inner and outer rings at least when the composite blade assembly is subject to centrifugal force to thereby prevent separation of the root portion and blade portion.

* * * * *